(12) United States Patent
Gu et al.

(10) Patent No.: US 12,198,884 B2
(45) Date of Patent: Jan. 14, 2025

(54) DIRECT CURRENT CONTACTOR WITH MOVING AND FIXED CONTACT COMPONENTS LOCATED WITHIN AN ARC-EXTINGUISHING CAVITY

(71) Applicant: Huawei Digital Power Technologies Co., Ltd., Shenzhen (CN)

(72) Inventors: Chunpeng Gu, Kunshan (CN); Hongjiang Dong, Kunshan (CN); Yan Ji, Kunshan (CN); Guangming Huang, Dongguan (CN); Taixian Chen, Dongguan (CN); Fugao Zhao, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 189 days.

(21) Appl. No.: 18/062,788

(22) Filed: Dec. 7, 2022

(65) Prior Publication Data
US 2023/0098632 A1  Mar. 30, 2023

Related U.S. Application Data

(63) Continuation of application No. PCT/CN2021/093420, filed on May 12, 2021.

(30) Foreign Application Priority Data

Jun. 24, 2020 (CN) .......................... 202010591488.5

(51) Int. Cl.
*H01H 73/18* (2006.01)
*H01H 50/04* (2006.01)
(Continued)

(52) U.S. Cl.
CPC .......... *H01H 73/18* (2013.01); *H01H 50/045* (2013.01); *H01H 50/58* (2013.01); *H01H 50/60* (2013.01)

(58) Field of Classification Search
None
See application file for complete search history.

(56) References Cited

U.S. PATENT DOCUMENTS 7,145,422 B2 * 12/2006 Imanishi ................ H01H 9/443
335/133
8,653,691 B2 * 2/2014 Hsu ........................ H01H 50/36
335/125
(Continued)

FOREIGN PATENT DOCUMENTS

CN 2337662 Y 9/1999
CN 101878511 A 11/2010
(Continued)

*Primary Examiner* — Bernard Rojas
(74) *Attorney, Agent, or Firm* — Maier & Maier, PLLC

(57) ABSTRACT

A direct current contactor includes a case and two groups of contact components disposed in the case. Each group of contact components includes two moving contacts connected to each other and two fixed contacts. The direct current contactor further includes a drive system configured to drive the moving contacts to move in a direction close to or away from the fixed contacts, so that the moving contacts are connected to or disconnected from the fixed contacts. The case has an arc-extinguishing cavity. A first baffle in the arc-extinguishing cavity divides the arc-extinguishing cavity into a first arc-extinguishing chamber and a second arc-extinguishing chamber. The contact components are respectively located in the first arc-extinguishing chamber and the second arc-extinguishing chamber. In other words, the two groups of contact components are integrated into two arc-extinguishing chambers of one arc-extinguishing cavity and perform connection/disconnection drive by using a single drive system.

17 Claims, 11 Drawing Sheets

(51) Int. Cl.
*H01H 50/58* (2006.01)
*H01H 50/60* (2006.01)

(56) References Cited

U.S. PATENT DOCUMENTS

| | | | |
|---|---|---|---|
| 9,076,617 B2 * | 7/2015 | Yamashita | ............... H01H 9/40 |
| 2009/0072935 A1 * | 3/2009 | Yuba | ...................... H01H 9/443 |
| | | | 335/201 |
| 2009/0114622 A1 | 5/2009 | Bush et al. | |
| 2011/0114602 A1 * | 5/2011 | Bush | .................... H01H 51/065 |
| | | | 218/156 |
| 2022/0277912 A1 * | 9/2022 | Yoo | ...................... H01H 50/045 |

FOREIGN PATENT DOCUMENTS

| | | |
|---|---|---|
| CN | 204155859 U | 2/2015 |
| CN | 104882335 A | 9/2015 |
| CN | 107026056 A | 8/2017 |
| CN | 108922827 A | 11/2018 |
| CN | 208045411 U | 11/2018 |
| CN | 208796916 U | 4/2019 |
| CN | 111863538 A | 10/2020 |

* cited by examiner

DIRECT CURRENT CONTACTOR WITH MOVING AND FIXED CONTACT COMPONENTS LOCATED WITHIN AN ARC-EXTINGUISHING CAVITY

CROSS-REFERENCE TO RELATED APPLICATIONS

This application is a continuation of International Application No. PCT/CN2021/093420, filed on May 12, 2021, which claims priority to Chinese Patent Application No. 202010591488.5, filed on Jun. 24, 2020. The disclosures of the aforementioned applications are hereby incorporated by reference in their entireties.

TECHNICAL FIELD

The embodiments relate to the field of electric power technologies, a direct current contactor, and a vehicle.

BACKGROUND

A contactor is an "automatic switch" that controls a relatively large current by using a relatively small current, and plays a role of automatic adjustment, safety protection, circuit conversion, and the like in a circuit. As a type of contactor, a direct current contactor is mainly used in a direct current circuit. As electric power technologies continuously develop, a direct current power supply system with the direct current contactor is widely used in industries such as electric vehicles, engineering machinery, luminous energy devices, and wind energy devices. For example, in a direct current charging circuit of a new energy vehicle, a high-voltage direct current contactor becomes an important power distribution control component in the circuit.

In a current direct current fast charging circuit, either on a power side of a direct current fast charging apparatus or inside an in-vehicle power distribution unit (PDU), based on a safety regulation requirement that an isolating distance needs to exist between a charging port/charging gun and an energized power supply bracket after a vehicle completes charging, one high-voltage direct current contactor is mounted on each of a positive line and a negative line to control the line to be disconnected or connected.

However, if the high-voltage direct current contactor is mounted on each of the positive line and the negative line, a volume of the charging apparatus is greatly increased. Consequently, the charging apparatus has a complex structure, a large volume, and relatively high manufacture costs.

SUMMARY

The embodiments may provide a direct current contactor and a vehicle, to resolve a problem that a charging apparatus has a relatively large volume and relatively high manufacture costs because one direct current contactor is mounted on each of a positive line and a negative line in an existing direct current fast charging circuit.

A first aspect may provide a direct current contactor, including a case and two groups of contact components disposed in the case, where each group of the contact components includes two moving contacts connected to each other and two fixed contacts opposite to the moving contacts, and the fixed contacts extend outside the case.

The case has an arc-extinguishing cavity, a first baffle is disposed in the arc-extinguishing cavity, the first baffle divides the arc-extinguishing cavity into a first arc-extinguishing chamber and a second arc-extinguishing chamber, and the two groups of the contact components are respectively disposed in the first arc-extinguishing chamber and the second arc-extinguishing chamber. In this way, the two groups of contact components are integrated into one arc-extinguishing cavity. The moving contacts and the fixed contacts of one group of the contact components may be controlled to be connected to or disconnected from each other, so as to control a positive line to be connected/disconnected, and the moving contacts and the fixed contacts of the other group of the contact components may be controlled to be connected to or disconnected from each other, so as to control a negative line to be connected/disconnected. In other words, connection/disconnection requirements of the positive line and the negative line can be met by using one direct current contactor, and there is no need to mount one direct current contactor on each of the positive line and the negative line of a charging apparatus. This simplifies the charging apparatus, significantly reduces a volume of the charging apparatus, and reduces costs of the charging apparatus.

The direct current contactor further includes a drive system, where the drive system is connected to the moving contacts of the two groups of contact components, and the drive system is configured to drive the moving contacts to move in a direction close to or away from the fixed contacts, so that the moving contacts are disconnected from or connected to the fixed contacts. A single drive system is used to drive the moving contacts of the two groups of contact components to move, so that the positive line and the negative line are connected/disconnected. In a single drive manner, the contactor can be simplified, a size of the contactor can be reduced, and a volume of the charging apparatus can be reduced. In addition, the two groups of contact components are simultaneously driven by using one drive system, so that connection/disconnection synchronization between the two groups of contact components can be improved, and reliability of the charging apparatus can be improved.

In a possible implementation of the first aspect, a first magnet and a second magnet are respectively disposed on two sides that are outside the first arc-extinguishing chamber and that are adjacent to the two moving contacts, the first magnet and the second magnet attract each other to form a first magnetic field, and the first magnet and the second magnet are opposite to gaps between the moving contacts and the fixed contacts.

A third magnet and a fourth magnet are respectively disposed on two sides that are outside the second arc-extinguishing chamber and that are adjacent to the two moving contacts, the third magnet and the fourth magnet attract each other to form a second magnetic field, and the third magnet and the fourth magnet are opposite to gaps between the moving contacts and the fixed contacts.

Magnetic field directions of the first magnetic field and the second magnetic field are perpendicular to directions of currents flowing through the fixed contacts and the moving contacts, and the magnetic field direction of the first magnetic field is opposite to the magnetic field direction of the second magnetic field. Arcs between the two moving contacts and the two fixed contacts in the first arc-extinguishing chamber are blown into the first arc-extinguishing chamber under magnetic field force of the first magnetic field, so that the arcs are prolonged and extinguished in the first arc-extinguishing chamber. Arcs between the two moving contacts and the two fixed contacts in the second arc-extinguishing chamber are blown into the second arc-extinguishing chamber under magnetic field force of the second magnetic field, so that the arcs are prolonged and extinguished. The directions of the first magnetic field and the second magnetic field are perpendicular to directions of currents between the fixed contacts and the moving contacts, so that forward break and reverse break of two arcs can be implemented without a polarity requirement, and non-polarity arc extinguishing of the two groups of contact components can be implemented. In addition, the magnetic field direction of the first magnetic field is opposite to the magnetic field direction of the second magnetic field. In this way, under an action of the first magnetic field and the second magnetic field, arc-blow directions between the moving contacts and the fixed contacts in the first arc-extinguishing chamber may be the same as arc-blow directions between the moving contacts and the fixed contacts that are in the second arc-extinguishing chamber and that are adjacent to the moving contacts and the fixed contacts in the first arc-extinguishing chamber. Therefore, the two arcs generated by a first group of contact component and a second group of contact component do not move in a direction opposite to each other during forward break and reverse break. This reduces a risk of arc collision, arc aggregation, and a short circuit, and effectively improves break performance.

In a possible implementation of the first aspect, the direct current contactor further includes a mounting bracket, where the mounting bracket includes a first bracket and a second bracket that are opposite to each other, the first bracket and the second bracket are disposed around a periphery of the case, the first magnet and the second magnet are disposed on an inner side wall of the first bracket, and the third magnet and the fourth magnet are disposed on an inner side wall of the second bracket. In this way, the first magnet and the second magnet are disposed outside the first arc-extinguishing chamber by using the first bracket, and the third magnet and the fourth magnet are disposed outside the second arc-extinguishing chamber by using the second bracket.

In a possible implementation of the first aspect, the first bracket and the second bracket are U-shaped brackets, a side wall of the U-shaped bracket has a first clamping member, an end of an opening of the U-shaped bracket has a second clamping member protruding towards the inside of the opening, and at least one of the first magnet, the second magnet, the third magnet, and the fourth magnet is disposed on the U-shaped bracket by using the first clamping member and the second clamping member. In this way, the first magnet, the second magnet, the third magnet, and the fourth magnet are disposed on the first bracket and the second bracket through clamping. This can facilitate assembly, disassembly, and replacement.

In a possible implementation of the first aspect, a direct current contactor further includes a housing, where the mounting bracket is located in the housing, a side or a corner of the at least one of the first magnet, the second magnet, the third magnet, and the fourth magnet has a hole, and an inner side wall of the housing has a first protrusion corresponding to the hole. When magnetic poles of the first magnet, the second magnet, the third magnet, and the fourth magnet are reversely or incorrectly mounted, because the hole and the first protrusion are disposed the first bracket on which the first magnet and the second magnet are disposed and the second bracket on which the third magnet and the fourth magnet are disposed cannot be assembled in the case. This can effectively avoid a problem that the first magnet, the second magnet, the third magnet, and the fourth magnet are mounted are reversely or incorrectly mounted and improve assembly accuracy and assembly efficiency.

In a possible implementation of the first aspect, the first clamping member is adjacent to the moving contact, an inner wall of an end that is of the housing and that is adjacent to the fixed contact has a second protrusion, and a side wall of the at least one of the first magnet, the second magnet, the third magnet, and the fourth magnet abuts against a side wall of the second protrusion. The first clamping member is located on an outer side wall of an end that is of the U-shaped bracket and that is close to the moving contact. When the first magnet, the second magnet, the third magnet, and the fourth magnet are disposed on the U-shaped support by using the first clamping member, a side that is of the magnet and that is close to the fixed contact is not limited. Consequently, there is a slip risk. A position of the magnet may be further limited by using the second protrusion, to prevent the magnet from falling off the U-shaped bracket and improve disposition stability of the magnet.

In a possible implementation of the first aspect, the first bracket and the second bracket are magnetic conductive plates with magnetic conductive performance. The first bracket and the second bracket are disposed around the periphery of the case, so that the first bracket and the second bracket are magnetic conductive plates and can play a role of shielding an external magnetic field, to improve arc-extinguishing performance of the first arc-extinguishing chamber and the second arc-extinguishing chamber and improve break performance of the direct current contactor.

In a possible implementation of the first aspect, the first magnet, the second magnet, the third magnet, and the fourth magnet are permanent magnets. In this way, the first magnet, the second magnet, the third magnet, and the fourth magnet have relatively strong magnetism, and are not easy to be demagnetized, so that magnetic field force of the first magnetic field and the second magnetic field can be ensured, and arc-blow and arc-extinguishing effects are ensured. In addition, the magnet has a relatively long service life, to help improve reliability of the direct current contactor.

In a possible implementation of the first aspect, the direct current contactor further includes a base plate, where the case is disposed on the base plate, and the case and the base plate surround the arc-extinguishing cavity. The base plate and the case may surround a sealed arc-extinguishing cavity. The base plate may also be a magnetic conductive plate with magnetic conductive performance, so that the external magnetic field can be shielded.

In a possible implementation of the first aspect, the case and the base plate are connected by using a connecting piece. Compared with a manner in which the case and the base plate are directly connected, in a manner of implementing a connection by using the connecting piece, a problem that the case and the base plate are deformed, are separated, and fall off in a high temperature may be reduced, to improve reliability of the direct current contactor.

In a possible implementation of the first aspect, a side wall that is of the first baffle and that faces the first arc-extinguishing chamber has a third protrusion, and a side wall that is of the first baffle and that faces the second arc-extinguishing chamber has a fourth protrusion. The third protrusion may increase a length of the side wall that is of the first baffle and that faces the first arc-extinguishing chamber, and therefore increase a creepage distance between a first moving contact and a first fixed contact, and a second moving contact and a second fixed contact. This helps extinguish the arc in a timely manner, saves space required for arc extinguishing, further improves break performance of the direct current contactor, and helps reduce a volume of the direct current contactor. The fourth protrusion may increase a length of the side wall that is of the first baffle and that faces the second arc-extinguishing chamber, and therefore increase a creepage distance between a third moving contact and a third fixed contact, and a fourth moving contact and a fourth fixed contact. This helps extinguish the arc in a timely manner, saves space required for arc extinguishing, and further improves break performance of the direct current contactor.

In a possible implementation of the first aspect, a side wall that is of the first arc-extinguishing chamber and that is opposite to the first baffle has a fifth protrusion, and a side wall that is of the second arc-extinguishing chamber and that is opposite to the first baffle has a sixth protrusion. The fifth protrusion may increase a length of the side wall that is of the first arc-extinguishing chamber and that is opposite to the first baffle, and therefore increase the creepage distance between the first moving contact and the first fixed contact, and the second moving contact and the second fixed contact. This helps extinguish the arc in a timely manner, saves space required for arc extinguishing, and further improves break performance of the direct current contactor. The sixth protrusion may increase a length of the side wall that is of the second arc-extinguishing chamber and that is opposite to the first baffle, and therefore increase the creepage distance between the third moving contact and the third fixed contact, and the fourth moving contact and the fourth fixed contact. This helps extinguish the arc in a timely manner, saves space required for arc extinguishing, and further improves break performance of the direct current contactor.

In a possible implementation of the first aspect, the drive system includes a drive component and a moving component, the moving component includes a support rod and a moving plate connected to the support rod, the moving plate is located in the arc-extinguishing cavity, and the moving contacts of the two groups of the contact components are disposed on the moving plate.

The drive component is configured to drive the moving component to move to drive the moving contacts to move, and when the moving contacts are disconnected from the fixed contacts, there is a gap between the first baffle and the moving plate. The moving plate is a plate-like structure with an area. Compared with an existing manner in which the moving contacts are disposed on a connecting rod, in this manner, the moving plate may provide higher strength and have higher mechanical strength. This helps improve reliability of the direct current contactor. In addition, the gap between the first baffle and the moving plate provides space for the moving plate to move, so as to ensure that the moving plate can move to drive the moving contacts to move.

In a possible implementation of the first aspect, the moving plate has a second baffle, the second baffle is located on an outer side of the gap, the second baffle extends towards the first baffle, and the second baffle at least partially overlap the first baffle. An end of the second baffle that faces the first baffle partially overlaps an end that is of the first baffle and that faces the second baffle, so that the second baffle can cover the gap. In this way, sealing between the first arc-extinguishing chamber and the second arc-extinguishing chamber is further improved, a probability that the arcs in the first arc-extinguishing chamber and the second arc-extinguishing chamber are in contact with each other is reduced, and break performance of the direct current contactor is improved.

In a possible implementation of the first aspect, a groove is disposed on the moving plate, a side wall of the groove forms the second baffle, and the first baffle extends into the groove. The groove has two side walls and one bottom wall connected to the two side walls. The two side walls of the groove are used as two second baffles, and the two second baffles and the first baffle jointly isolate and separate the first arc-extinguishing chamber and the second arc-extinguishing chamber. In addition, the groove may be further disposed to increase a creepage distance between the first group of contact component and the second group of contact component. This helps extinguish the arc in a timely manner and improves break performance of the direct current contactor.

In a possible implementation of the first aspect, the second baffle is disposed at each of positions that are on the moving plate and that are opposite to the two moving contacts. An arc is generated at a position at which the moving contact is opposite to the fixed contact, and an arc at a position at which the two moving contacts are connected has a relatively small impact. Therefore, the second baffle may be disposed only at each of positions that are on the moving plate and that are opposite to the two moving contacts, and no second baffle may be disposed at a position opposite to a position at which the moving contacts are connected In this way, a structure of the moving component can be simplified, and costs can also be reduced.

In a possible implementation of the first aspect, the drive system further includes a drive chamber, the drive component is located in the drive chamber, one end of the support rod is located in the drive chamber, and the other end of the support rod extends into the arc-extinguishing cavity.

In a possible implementation of the first aspect, the contact component further includes a moving contact bridge and an elastic component, the two moving contacts are connected by using the moving contact bridge, and the elastic component is located between the moving contact bridge and the moving plate. When the moving plate moves to drive the moving contacts to move in the direction close to the fixed contacts, the moving contacts first abut against the fixed contacts. When the moving plate continues to move, the elastic component located between the moving plate and the moving contact bridge is compressed, and the compressed elastic component pushes the moving contacts, so that the moving contacts are pressed against the fixed contacts. This ensures reliable contact between the moving contacts and the fixed contacts and improves stability of a connection between the moving contacts and the fixed contacts.

In a possible implementation of the first aspect, the contact component further includes a U-shaped fixed bracket, the moving contact bridge and the elastic component are located in the fixed bracket, and an opening end of the fixed bracket is disposed on the moving plate. In this way, the moving contact bridge and the elastic component are disposed on the moving plate by using the fixed bracket, and no shaft hole needs to be provided on the moving contact and the moving contact bridge. This avoids affecting a conductive area of the contact component, ensures conductive performance of the contact component, and helps improve a capability of the contact component to carry a current.

A second aspect may provide a vehicle, including at least any one of the foregoing direct current contactors. In the direct current contactor, a single drive manner is used to integrate two groups of contact components into one arc-extinguishing cavity, to implement a dual connection between the contactor and both a positive line and a negative line, so that a structure of the contactor is simplified. In addition, there is no need to dispose one contactor on each of the positive line and the negative line, so that a volume and manufacture costs of a charging apparatus are significantly reduced, and miniaturization is implemented, and a load capability is improved, to help implement a low-cost and lightweight requirement of the vehicle.

DETAILED DESCRIPTION OF THE EMBODIMENTS

The terms are merely used to explain the embodiments, but are not intended to limit. The following describes in detail the embodiments with reference to the accompanying drawings.

Figure 1:
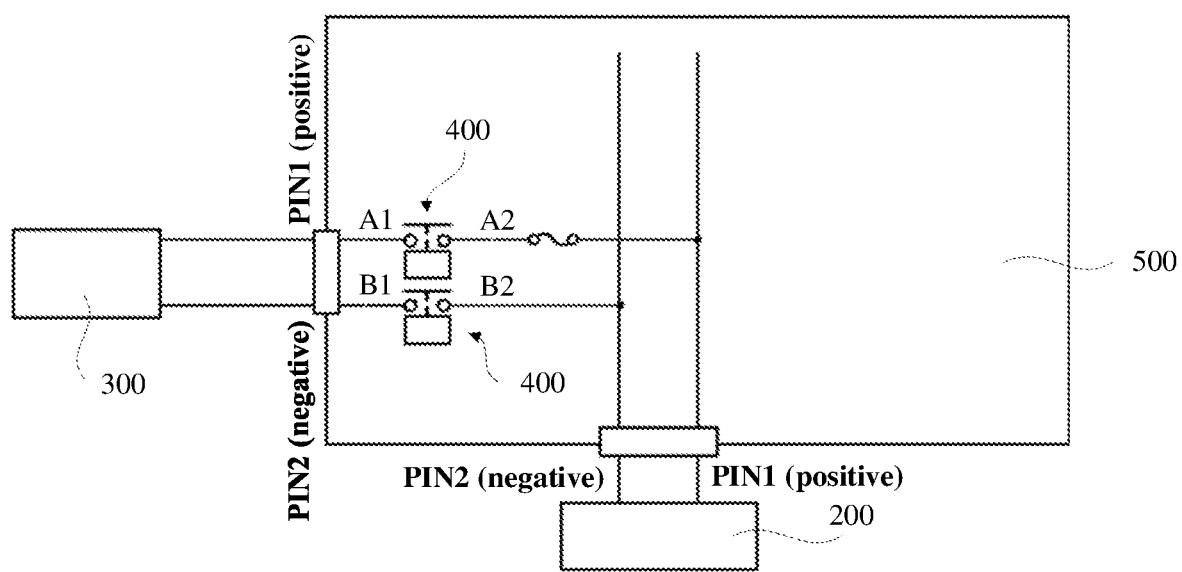
FIG. 1 is a schematic diagram of applying an existing direct current contactor to a charging circuit.

Currently, electric vehicles, as environmental-friendly and energy-saving vehicles, are increasingly widely used, and fast charging contactors that used with the electric vehicles are also widely used. A direct current contactor has become an important power distribution control component in a direct current charging circuit of the electric vehicle. In a current direct current fast charging circuit, an electric vehicle and a direct current fast charging apparatus are used as an example. Referring to FIG. 1, a PDU 500 and a high-voltage battery pack 200 connected to the PDU 500 are disposed in the electric vehicle. The charging apparatus of the electric vehicle has two wiring terminals: PIN1 and PIN2. PIN1 is a positive terminal, and PIN2 is a negative terminal. The terminal PIN1 is connected to the PDU 500 by using one direct current contactor 400, the PDU 500 is connected to a positive electrode of the high-voltage battery pack 200, and the terminal PIN2 is connected to a negative electrode of the high-voltage battery pack 200 by using one direct current contactor 400. During use, a connection between the direct current fast charging apparatus 300 and the high-voltage battery pack 200 is controlled by controlling the two direct current contactors to be connected or disconnected. In the foregoing direct current fast charging circuit, one direct current contactor needs to be connected to each of the terminal PIN1 and the terminal PIN2. Consequently, the entire charging apparatus has a relatively large volume, occupies relatively large space, and has relatively high costs. In addition, when the two direct current contactors are separately disposed, it is also difficult to simultaneously disconnect or connect a positive line and a negative line.

To reduce the volume and the costs of the charging apparatus, in a conventional technology, two contactors may be integrated. For example, two single contactors are used to independently control the positive line and the negative line, and then the two single contactors are integrally encapsulated and integrated. The contactor includes two cavities, each cavity has one contactor, and each contactor includes one moving contact, one fixed contact, and one electromagnetic drive mechanism. One group of control lines is used to simultaneously control the two electromagnetic drive mechanisms to drive the moving contact to be connected to or disconnected from the fixed contact. However, a volume of the contactor is still relatively large and needs to be further reduced, and manufacture costs are also relatively high. Consequently, a low-cost and lightweight requirement of a new energy vehicle cannot be met.

The embodiments may provide a direct current contactor. The direct current contactor may be used for an electrical connection such as a connection between an electric vehicle and a direct current fast charging apparatus or a connection between another electric cabinet and an electrical device. In the direct current contactor, a single drive manner is used to form two arc-extinguishing chambers in one arc-extinguishing cavity to accommodate two groups of contact components, so as to implement a dual connection between the contactor and both a positive line and a negative line, so that a structure of the direct current contactor is simplified. In addition, there is no need to dispose one contactor on each of the positive line and the negative line, so that a volume of the charging apparatus is significantly reduced, and costs are reduced.

The following describes the direct current contactor by using an example in which the direct current contactor is used for the connection between the electric vehicle and the direct current fast charging apparatus.

Figure 2:
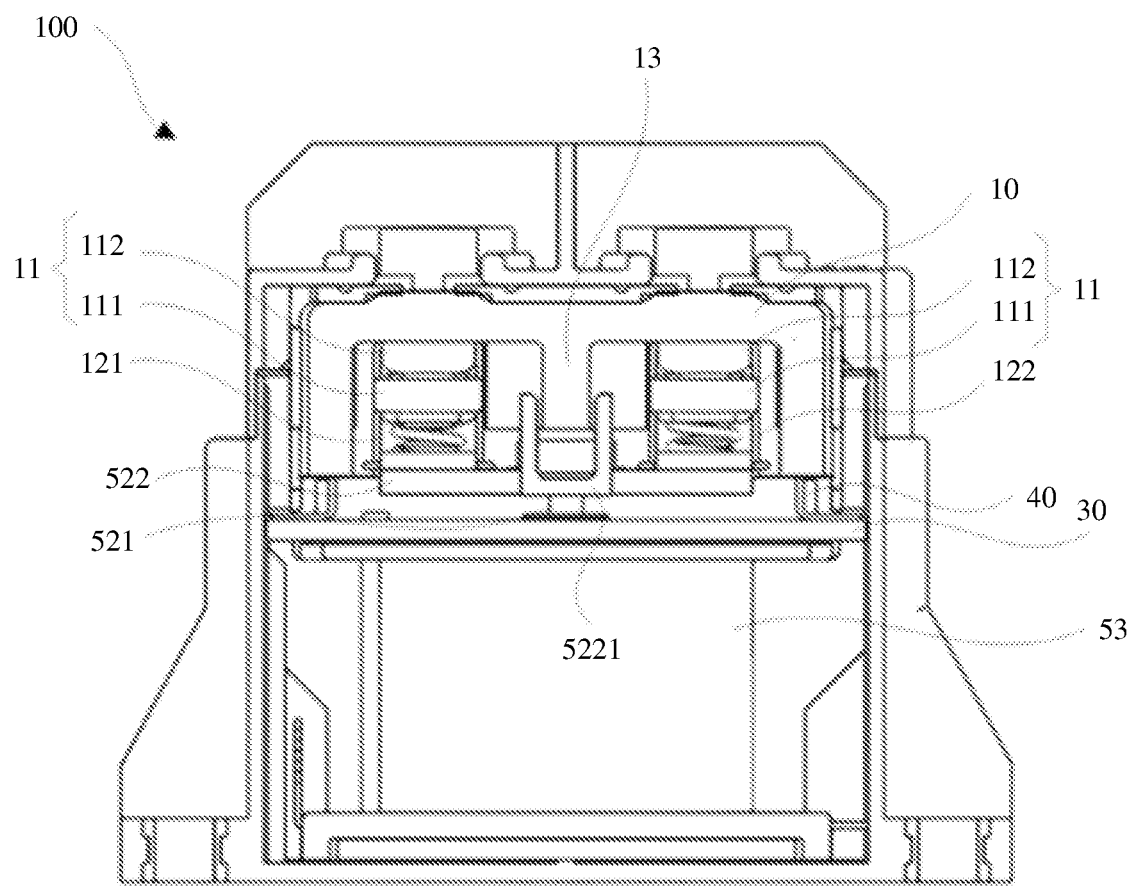
FIG. 2 is a schematic diagram of a structure of a direct current contactor according to an embodiment.

Referring to FIG. 2, the embodiments may provide a direct current contactor 100, including a case 10 and two groups of contact components 11 disposed in the case 10. Each group of contact component 11 includes two moving contacts 111 connected to each other and two fixed contacts 112 opposite to the two moving contacts 111. The fixed contacts 112 extend outside the case 10, so that the fixed contacts 112 are connected to a positive line or a negative line.

Figure 3:
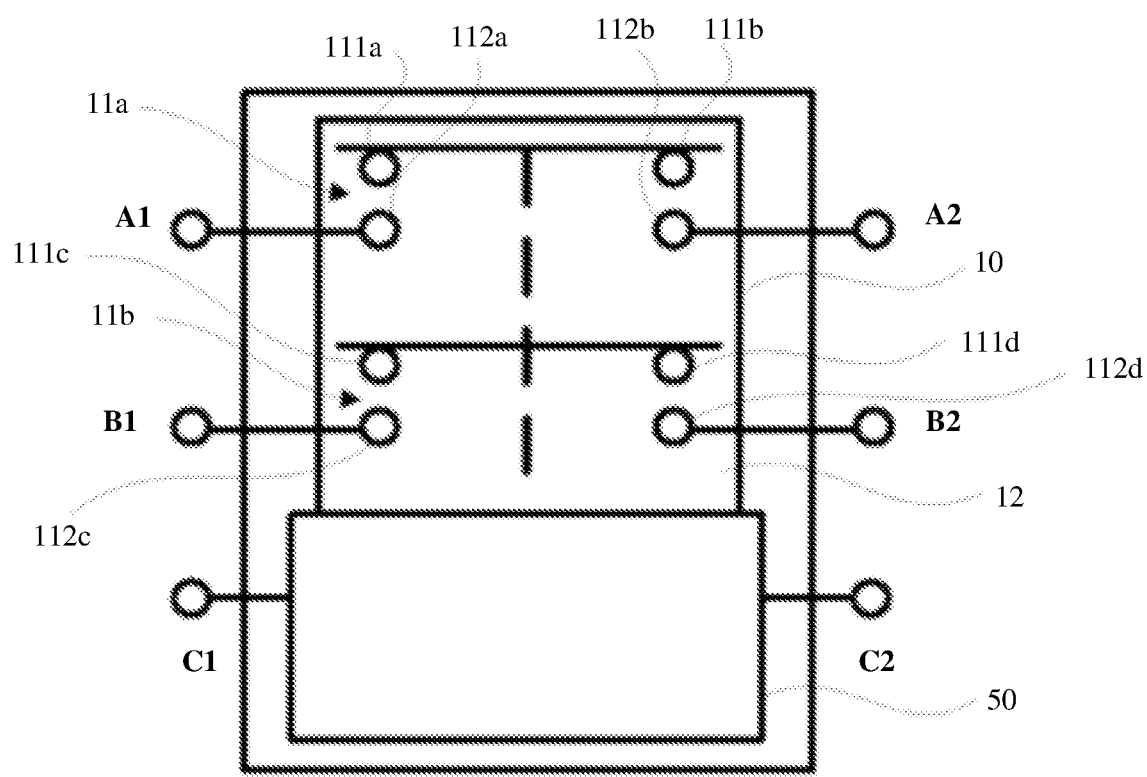
FIG. 3 is a schematic diagram of a wiring principle of a direct current contactor according to an embodiment.

Referring to FIG. 3, the two groups of contact components 11 in the case 10 are respectively a first group of contact component 11a and a second group of contact component 11b. The first group of contact component 11a includes a first moving contact 111a, a second moving contact 111b connected to the first moving contact 111a, and a first fixed contact 112a and a second fixed contact 112b that are respectively opposite to the first moving contact 111a and the second moving contact 111b. The second group of contact component 11b includes a third moving contact 111c, a fourth moving contact 111d connected to the third moving contact 111c, and a third fixed contact 112c and a fourth fixed contact 112d that are respectively opposite to the third moving contact 111c and the fourth moving contact 111d. The first group of contact component 11a and the second group of contact component 11b are parallel, the first moving contact 111a and the third moving contact 111c are adjacent, and the second moving contact 111b and the fourth moving contact 111d are adjacent.

Four connecting busbars may be disposed on the case 10, and are respectively a first connecting busbar A1, a second connecting busbar A2, a third connecting busbar B1, and a fourth connecting busbar B2. The first connecting busbar A1 and the second connecting busbar A2 are respectively connected to the first fixed contact 112a and the second fixed contact 112b. The third connecting busbar B1 and the fourth connecting busbar B2 are respectively connected to the third fixed contact 112c and the fourth fixed contact 112d. A fifth connecting busbar C1 and a sixth connecting busbar C2 may be further disposed on the case 10, to electrically connect a drive system 50.

When the direct current contactor 100 is used in a direct current fast charging circuit, the first connecting busbar A1 may be connected to a terminal PIN1, the third connecting busbar B1 may be connected to a terminal PIN2, the second connecting busbar A2 is connected to a positive electrode of a high-voltage battery pack, and the fourth connecting busbar B2 is connected to a negative electrode of the high-voltage battery pack, that is, the first connecting busbar A1 and the second connecting busbar A2 are a positive circuit, and the third connecting busbar B1 and the fourth connecting busbar B2 are a negative circuit. When the first moving contact 111a is in electrical contact with the first fixed contact 112a, and the second moving contact 111b is in electrical contact with the second fixed contact 112b, the first connecting busbar A1 is connected to the second connecting busbar A2. After passing through the first connecting busbar A1 from the terminal PIN1, a current sequentially passes through the first fixed contact 112a, the first moving contact 111a, the second moving contact 111b, the second fixed contact 112b, and the second connecting busbar A2, and then flows into the positive electrode of the high-voltage battery pack.

When the third moving contact 111c is in electrical contact with the third fixed contact 112c, and the fourth moving contact 111d is in electrical contact with the fourth fixed contact 112d, the third connecting busbar B1 is connected to the fourth connecting busbar B2. A current flows from the positive electrode of the high-voltage battery pack into the fourth connecting busbar B2 through the negative electrode of the high-voltage battery pack, then sequentially passes through the fourth fixed contact 112d, the fourth moving contact 111d, the third moving contact 111c, the third fixed contact 112c, and the third connecting busbar B1, and then flows into the terminal PIN2, to form a circuit. The moving contacts and the fixed contacts of the first group of contact component 11a may be controlled to be connected to or disconnected from each other, to control the positive line to be connected/disconnected, and the moving contacts and the fixed contacts of the second group of contact component 11b may be controlled to be connected to or disconnected from each other, to control the negative line to be connected/disconnected.

In this embodiment, connection/disconnection requirements of the positive line and the negative line can be met by using one direct current contactor 100, and there is no need to mount one direct current contactor on each of the positive line and the negative of the charging apparatus. This simplifies the charging apparatus, significantly reduces a volume of the charging apparatus, and reduces costs of the charging apparatus.

In this embodiment, alternatively, the first connecting busbar A1 may be connected to the terminal PIN2, and the third connecting busbar B1 may be connected to the terminal PIN1. Break of the moving contacts 111 and the fixed contacts 112 in the contact component 11 when the first connecting busbar A1 is connected to the terminal PIN1 is used as forward break of the moving contacts 111 and the fixed contacts 112 in the contact component 11 when the first connecting busbar A1 is connected to the terminal PIN2 is used as reverse break.

Referring to FIG. 3, the case 10 has an arc-extinguishing cavity 12, and a first baffle 13 is disposed in the arc-extinguishing cavity 12. As shown in FIG. 2, the first baffle 13 divides the arc-extinguishing cavity 12 into a first arc-extinguishing chamber 121 and a second arc-extinguishing chamber 122, and the two groups of contact components 11 are respectively disposed in the first arc-extinguishing chamber 121 and the second arc-extinguishing chamber 122. An arc is generated in a process in which the moving contacts 111 and the fixed contacts 112 in the contact component 11 are connected to or disconnected from each other. The first baffle 13 plays a role of blocking the first arc-extinguishing chamber 121 and the second arc-extinguishing chamber 122 and may prevent arcs in the two arc-extinguishing chambers from being in contact with each other, reduce a risk of a short circuit, and improve break performance of the direct current contactor 100.

In addition, one arc-extinguishing cavity 12 is divided into two arc-extinguishing chambers, to respectively dispose the two groups of contact components 11. Compared with an existing manner in which two contactors are integrally encapsulated, this manner can simplify the contactor, reduce a size of the contactor, and reduce a volume of the charging apparatus.

The direct current contactor 100 further includes a drive system 50. The drive system 50 is connected to the moving contacts 111 of the two groups of contact components 11. The drive system 50 is configured to drive the moving contacts 111 to move in a direction close to or away from the fixed contacts 112, so that the fixed contacts 112 are disconnected from or connected to the moving contacts 111, to control the positive line and the negative line to be connected/disconnected.

In this embodiment, the single drive system 50 may be used to drive the moving contacts 111 of the two groups of contact components 11 to move, so that the positive line and the negative line are connected/disconnected. Compared with an existing manner in which two contactors are integrally encapsulated, a single drive manner can simplify the contactor, reduce a size of the contactor, and reduce a volume of the charging apparatus. In addition, the two groups of contact components 11 are simultaneously driven by using one drive system 50, so that connection/disconnection synchronization between the two groups of contact components 11 can be improved, to improve connection/disconnection synchronization between the positive line and the negative line in the charging apparatus and improve reliability of the charging apparatus.

Figure 5:
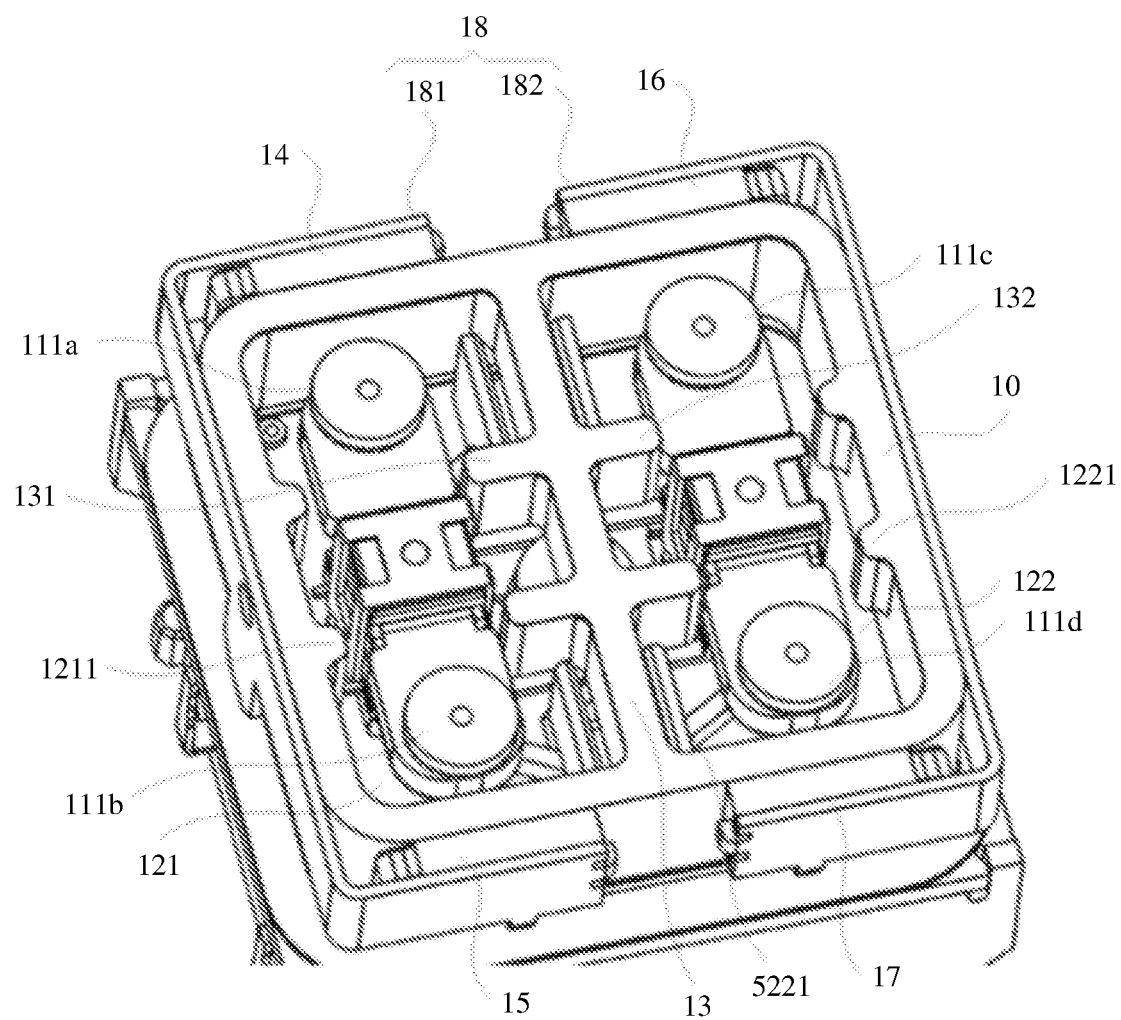
FIG. 5 is a schematic diagram of a structure of an arc-extinguishing cavity in a direct current contactor according to an embodiment.

Referring to FIG. 5, in this embodiment, a first magnet 14 and a second magnet 15 are respectively disposed on two sides that are outside the first arc-extinguishing chamber 121 and that are adjacent to the two moving contacts 111. The first magnet 14 is adjacent to the first moving contact 111a, the second magnet 15 is adjacent to the second moving contact 111*b*, the first magnet 14 and the second magnet 15 attract each other to form a first magnetic field, and the first magnet 14 and the second magnet 15 are opposite to gaps between the moving contacts 111 and the fixed contacts 112. The first magnet 14 and the second magnet 15 are configured to extinguish arcs generated between the moving contacts 111 and the fixed contacts 112 in the first group of contact component 11*a*.

Figure 8:
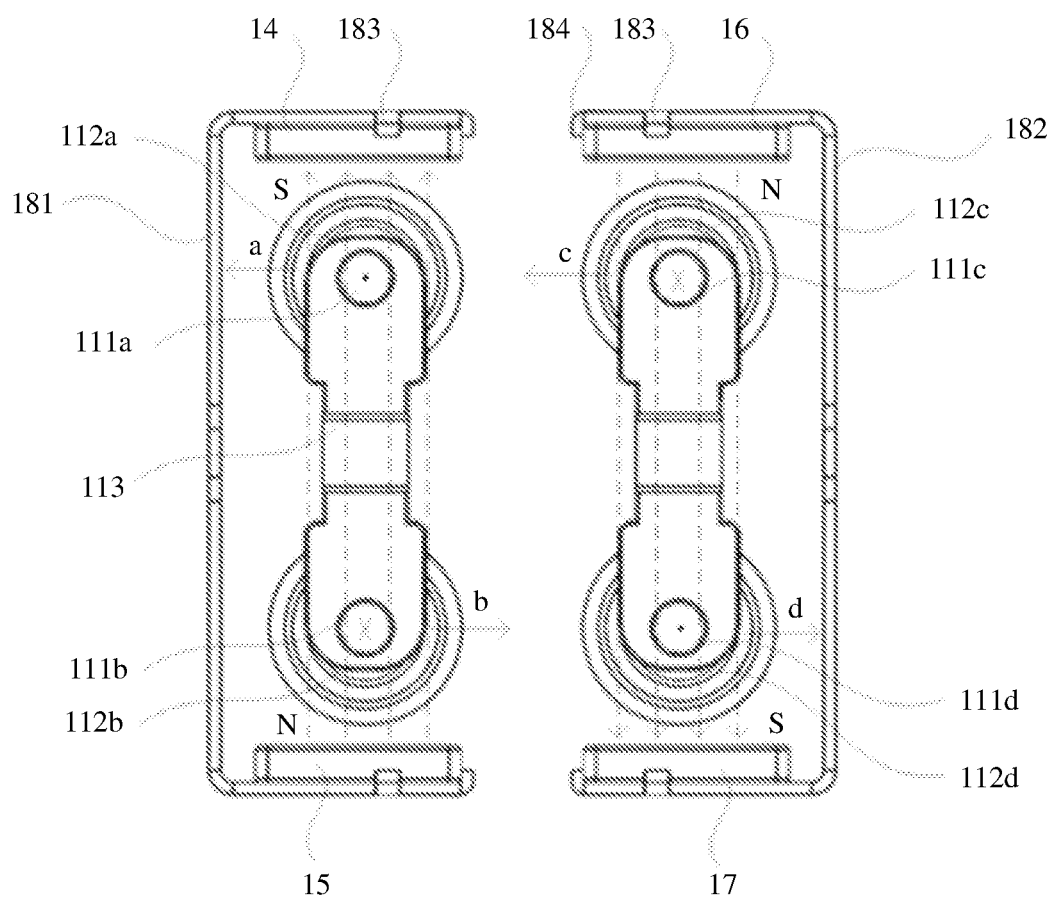
FIG. 8 is a schematic diagram of an arc-blow principle of a direct current contactor during forward break according to an embodiment.

Referring to FIG. 8, when the moving contacts 111 are connected to or disconnected from the fixed contacts 112, arcs are generated at gaps at which the moving contacts 111 are connected to or disconnected from the fixed contacts 112, and the arc is blown into the first arc-extinguishing chamber 121 under magnetic field force of the first magnetic field, so that the arc is prolonged and extinguished in the first arc-extinguishing chamber 121.

A magnetic field direction of the first magnetic field is perpendicular to directions of currents flowing through the fixed contacts 112 and the moving contacts 111. Referring to FIG. 8, an example in which the first connecting busbar A1 is connected to the terminal PIN1 is used. In this case, a direction of a current flowing through the first fixed contact 112*a* and the first moving contact 111*a* is a direction pointing from the first fixed contact 112*a* to the first moving contact 111*a*. As shown in FIG. 8, the direction of the current is outward (towards the outside of paper). A current flowing through the second fixed contact 112*b* and the second moving contact 111*b* is inward (towards the inside of paper). An end that is of the first magnet 14 and that is close to the first moving contact 111*a* is the S pole, and an end that is of the second magnet 15 and that is close to the second moving contact 111*b* is the N pole. In other words, the direction of the first magnetic field is an upward direction shown in FIG. 8, and points from the second magnet 15 to the first magnet 14. According to the left-hand rule, it may be understood that an arc between the first moving contact 111*a* and the first fixed contact 112*a* is blown to the left (namely, a direction of a in the figure) shown in FIG. 8 under the magnetic field force, and an arc between the second moving contact 111*b* and the second fixed contact 112*b* is blown to the right (namely, a direction of b in the figure) under the magnetic field force, so that the arc is blown into the first arc-extinguishing chamber and extinguished.

Referring to FIG. 5, a third magnet 16 and a fourth magnet 17 are respectively disposed on two sides that are outside the second arc-extinguishing chamber 122 and that are adjacent to the two moving contacts 111. The third magnet 16 is adjacent to the third moving contact 111*c*, the fourth magnet 17 is adjacent to the fourth moving contact 111*d*, the third magnet 16 and the fourth magnet 17 attract each other to form a second magnetic field, and the third magnet 16 and the fourth magnet 17 are opposite to gaps between the moving contacts 111 and the fixed contacts 112. The third magnet 16 and the fourth magnet 17 are configured to extinguish arcs generated between the moving contacts 111 and the fixed contacts 112 in the second group of contact component 11*b*.

Referring to FIG. 8, when the third moving contact 111*c* is connected to or disconnected from the third fixed contact 112*c*, and the fourth moving contact 111*d* is connected to or disconnected from the fourth fixed contact 112*d*, arcs are generated at gaps at which the moving contacts are connected to or disconnected from the fixed contacts, and the arc is blown into the second arc-extinguishing chamber 122 under magnetic field force of the second magnetic field, so that the arc is prolonged and extinguished in the second arc-extinguishing chamber 122.

A magnetic field direction of the second magnetic field is perpendicular to directions of currents flowing through the fixed contacts 112 and the moving contacts 111. As shown in FIG. 8, a current flowing through the third fixed contact 112*c* and the third moving contact 111*c* is inward, and a current flowing through the fourth fixed contact 112*d* and the fourth moving contact 111*d* is outward. An end that is of the third magnet 16 and that is close to the third moving contact 111*c* is the N pole, and an end that is of the fourth magnet 17 and that is close to the fourth moving contact 111*d* is the S pole, in other words, the direction of the second magnetic field is a downward direction shown in FIG. 8, and points from the third magnet 16 to the fourth magnet 17. According to the left-hand rule, it may be understood that an arc between the third moving contact 111*c* and the third fixed contact 112*c* is blown to the left (namely, a direction of c in the figure) shown in FIG. 8 under the magnetic field force, and an arc between the fourth moving contact 111*d* and the fourth fixed contact 112*d* is blown to the right (namely, a direction of d in the figure) under the magnetic field force, so that the arc is blown into the second arc-extinguishing chamber and extinguished.

Figure 9:
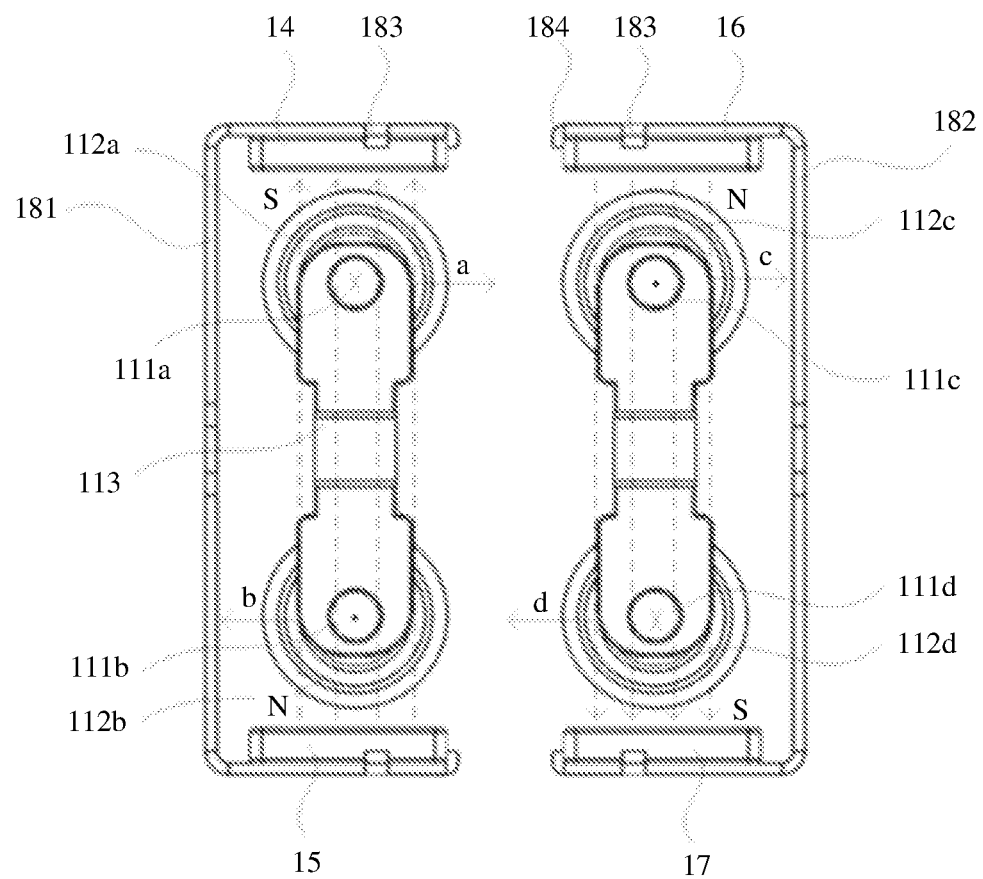
FIG. 9 is a schematic diagram of an arc-blow principle of a direct current contactor during reverse break according to an embodiment.

The first connecting busbar A1 may be connected to the terminal PIN2. In this case, a direction of a current flowing through the first fixed contact 112*a* and the first moving contact 111*a* is a direction pointing from the first moving contact 111*a* to the first fixed contact 112*a*. As shown in FIG. 9, the direction of the current is inward. A direction of a current flowing through the second fixed contact 112*b* and the second moving contact 111*b* is outward. The direction of the first magnetic field is still upward, and points from the second magnet 15 to the first magnet 14. According to the left-hand rule, it may be understood that an arc between the first moving contact 111*a* and the first fixed contact 112*a* is blown to the right (namely, a direction of a in the figure) under the magnetic field force, and an arc between the second moving contact 111*b* and the second fixed contact 112*b* is blown to the left (namely, a direction of b in the figure), so that the arc is blown into the first-extinguishing chamber 121 and extinguished.

A current flowing through the third fixed contact 112*c* and the third moving contact 111*c* is outward, a current flowing through the fourth fixed contact 112*d* and the fourth moving contact 111*d* is inward, and the direction of the second magnetic field points from the third magnet 16 to the fourth magnet 17. Referring to FIG. 9, according to the left hand rule, it may be understood that an arc between the third moving contact 111*c* and the third fixed contact 112*c* is blown to the right (namely, a direction of c in the figure) under the magnetic field force, and an arc between the fourth moving contact 111*d* and the fourth fixed contact 112*d* is blown to the left (namely, a direction of d in the figure) under the magnetic field force, so that the arc is blown into the second arc-extinguishing chamber and extinguished. In other words, in the direct current contactor 100 in this embodiment, forward break and reverse break of two arcs can be implemented without a polarity requirement, and non-polarity arc extinguishing of the two groups of contact components can be implemented.

In this embodiment, the magnetic field direction of the first magnetic field is opposite to the magnetic field direction of the second magnetic field. Under an action of the first magnetic field and the second magnetic field, arc-blow directions between the moving contacts 111 and the fixed contacts 112 in the first arc-extinguishing chamber 121 may be the same as arc-blow directions between the moving contacts 111 and the fixed contacts 112 that are in the second arc-extinguishing chamber 122 and that are adjacent to the moving contacts 111 and the fixed contacts 112 in the first arc-extinguishing chamber 121. For example, an arc-blow direction between the first moving contact 111a and the first fixed contact 112a is the same as an arc-blow direction between the third moving contact 111c and the third fixed contact 112c, and an arc-blow direction between the second moving contact 111b and the fixed contact 112b is the same as an arc-blow direction between the fourth moving contact 111d and the fourth fixed contact 112d. Therefore, the two arcs generated by the first group of contact component 11a and the second group of contact component 11b do not move in a direction opposite to each other during forward break and reverse break. This reduces a risk of arc collision, arc aggregation, and a short circuit, and effectively improves break performance.

Referring to FIG. 8, the current flowing through the first fixed contact 112a and the first moving contact 111a is outward, the current flowing through the second fixed contact 112b and the second moving contact 111b is inward, the direction of the first magnetic field is upward and points from the second magnet 15 to the first magnet 14, the arc-blow direction between the first moving contact 111a and the first fixed contact 112a is leftward, and the arc-blow direction between the second moving contact 111b and the second fixed contact 112b is rightward. The current flowing through the third fixed contact 112c and the third moving contact 111c is inward, the current flowing through the fourth fixed contact 112d and the fourth moving contact 111d is outward, the direction of the second magnetic field is opposite to the direction of the first magnetic field, the direction of the second magnetic field is downward and points from the third magnet 16 to the fourth magnet 17, the arc-blow direction between the third moving contact 111c and the third fixed contact 112c is leftward, and the arc-blow direction between the fourth moving contact 111d and the fourth fixed contact 112d is rightward. In other words, the arc-blow direction between the first moving contact 111a and the first fixed contact 112a is the same as the arc-blow direction between the third moving contact 111c and the third fixed contact 112c that are adjacent to the first moving contact 111a and the first fixed contact 112a, and the arc-blow direction between the second moving contact 111b and the second fixed contact 112b is the same as the arc-blow direction between the fourth moving contact 111d and the fourth fixed contact 112d that are adjacent to the second moving contact 111b and the second fixed contact 112b. In this way, it is ensured that there is no collision between the two arcs during forward break, to effectively improve break performance of the contactor.

Referring to FIG. 9, the current flowing through the first fixed contact 112a and the first moving contact 111a is inward, the current flowing through the second fixed contact 112b and the second moving contact 111b is outward, the direction of the first magnetic field is upward and points from the second magnet 15 to the first magnet 14, the arc-blow direction between the first moving contact 111a and the first fixed contact 112a is rightward, and the arc-blow direction between the second moving contact 111b and the second fixed contact 112b is leftward. The current flowing through the third fixed contact 112c and the third moving contact 111c is outward, the current flowing through the fourth fixed contact 112d and the fourth moving contact 111d is inward, the direction of the second magnetic field is downward and points from the third magnet 16 to the fourth magnet 17, the arc-blow direction between the third moving contact 111c and the third fixed contact 112c is rightward, and the arc-blow direction between the fourth moving contact 111d and the fourth fixed contact 112d is leftward. In other words, the arc-blow direction between the first moving contact 111a and the first fixed contact 112a is the same as the arc-blow direction between the third moving contact 111c and the third fixed contact 112c that are adjacent to the first moving contact 111a and the first fixed contact 112a, and the arc-blow direction between the second moving contact 111b and the second fixed contact 112b is the same as the arc-blow direction between the fourth moving contact 111d and the fourth fixed contact 112d that are adjacent to the second moving contact 111b and the second fixed contact 112b. In this way, it is ensured that there is no collision between the two arcs during reverse break, to effectively improve break performance of the direct current contactor 100.

In this embodiment, a material used to form the case 10 may be a magnetic conductive material such as a ceramic and may play a role of shielding an external magnetic field. However, the first baffle 13 in the case 10 may be formed through protrusion on an inner top wall of the case 10, the first baffle 13 and the case 10 may be integrally formed, and the first baffle 13 may prevent arcs blowing into the first arc-extinguishing chamber 121 and the second arc-extinguishing chamber 122 from being in contact with each other, to further improve break performance of the direct current contactor 100.

The direct current contactor 100 further includes a mounting bracket 18. Referring to FIG. 5, the mounting bracket 18 includes a first bracket 181 and a second bracket 182 that are opposite to each other. The first bracket 181 and the second bracket 182 are disposed around a periphery of the case 10. The first magnet 14 and the second magnet 15 are disposed on an inner side wall of the first bracket 181. The third magnet 16 and the fourth magnet 17 are disposed on an inner side wall of the second bracket 182. In other words, the first bracket 181 is located on a periphery of the first arc-extinguishing chamber 121, and the second bracket 182 is located on a periphery of the second arc-extinguishing chamber 122. The first magnet 14 and the second magnet 15 are disposed outside the first extinguishing chamber 121 by using the first bracket 181, and the third magnet 16 and the fourth magnet 17 are disposed outside the second arc-extinguishing chamber 122 by using the second bracket 182.

Figure 11:
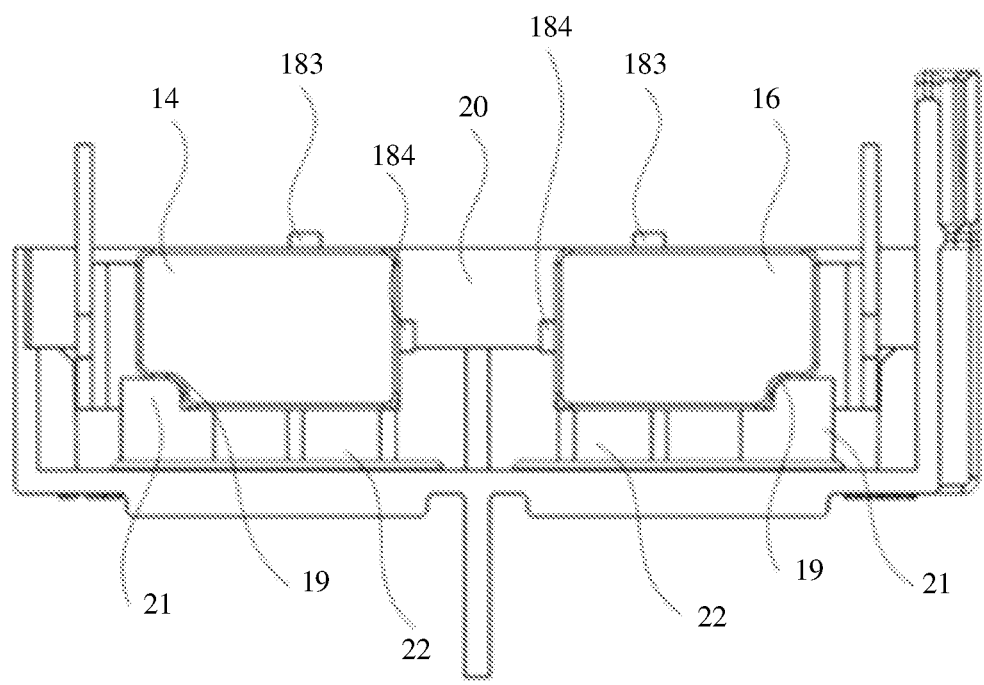
FIG. 11 is a schematic diagram of cross sections of a housing and a mounting bracket in a direct current contactor according to an embodiment.

The first bracket 181 and the second bracket 182 may be U-shaped brackets. Referring to FIG. 11, a side wall of the U-shaped bracket has a first clamping member 183, an end of an opening of the U-shaped bracket has a second clamping member 184 protruding towards the inside of the opening, and at least one of the first magnet 14, the second magnet 15, the third magnet 16, and the fourth magnet 17 is disposed on the U-shaped bracket by using the first clamping member 183 and the second clamping member 184. In other words, the first magnet 14, the second magnet 15, the third magnet 16, and the fourth magnet 17 are disposed on the first bracket 181 and the second bracket 182 through clamping. This can facilitate assembly, disassembly, and replacement.

The first clamping member 183 may be a clamping jaw, a clamping slot, or another clamping member that is disposed on an outer wall of a side of the U-shaped bracket, and the second clamping member 184 may also be a clamping jaw, a clamping slot, or another clamping member that is formed after the end of the opening protrudes towards the inside.

The first bracket 181 and the second bracket 182 may be magnetic conductive plates with magnetic conductive performance. The first bracket 181 and the second bracket 182 are disposed around the periphery of the case 10. The first bracket 181 may be disposed around on the periphery of the first arc-extinguishing chamber 121, and the second bracket 182 may be disposed on the periphery of the second arc-extinguishing chamber 122, so that the first bracket 181 and the second bracket 182 are magnetic conductive plates such as metal brackets, and can play a role of shielding the external magnetic field, to improve arc-extinguishing performance of the first arc-extinguishing chamber 121 and the second arc-extinguishing chamber 122, and improve break performance of the direct current contactor 100.

In this embodiment, the first magnet 14, the second magnet 15, the third magnet 16, and the fourth magnet 17 may be permanent magnets, have relatively strong magnetism, and are not easy to be demagnetized, so that the magnetic field force of the first magnetic field and the second magnetic field can be ensured, and arc-blow and arc-extinguishing effects are ensured. In addition, the magnet has a relatively long service life, to help improve reliability of the direct current contactor 100.

Figure 7:
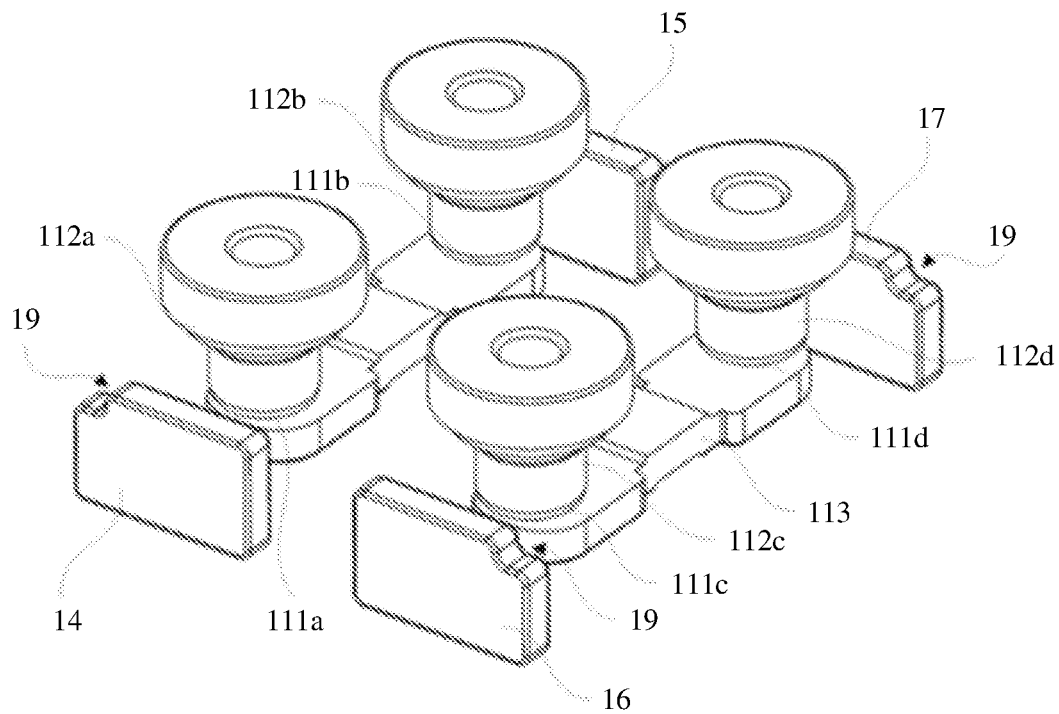
FIG. 7 is a schematic diagram of disposing two groups of contact components and magnets in a direct current contactor according to an embodiment.
Figure 10:
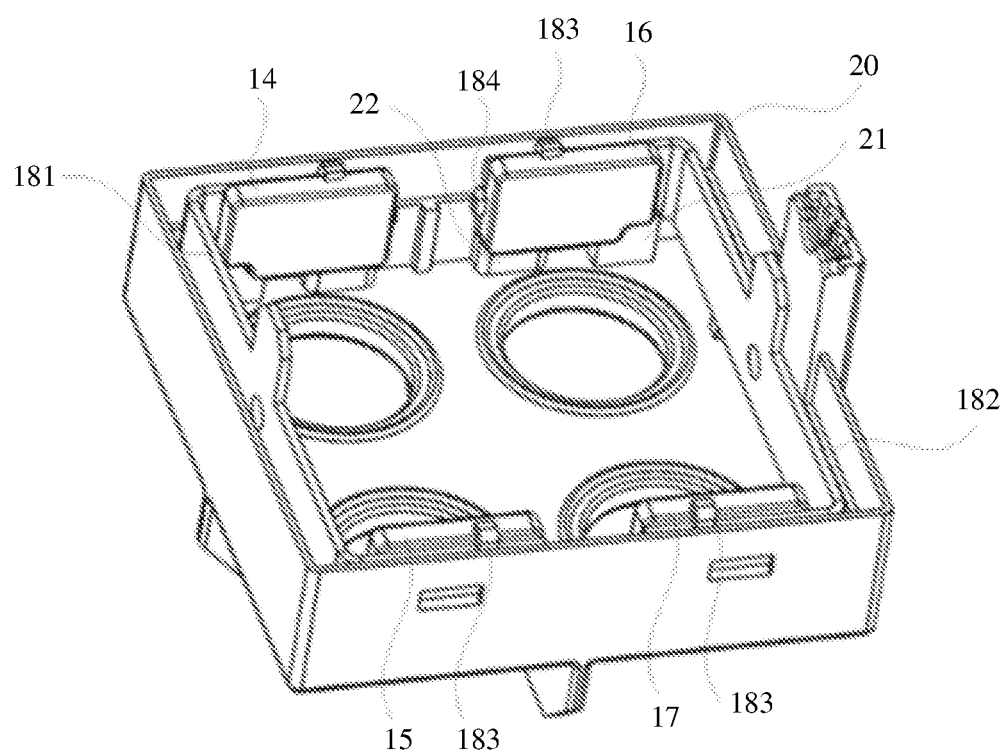
FIG. 10 is a schematic diagram of disposing a housing and a mounting bracket in a direct current contactor according to an embodiment.

Referring to FIG. 10, the direct current contactor 100 further includes a housing 20, and the mounting bracket 18 is located in the housing 20. Referring to FIG. 7, a side or a corner of the at least one of the first magnet 14, the second magnet 15, the third magnet 16, and the fourth magnet 17 has a hole 19. As shown in FIG. 10, an inner side wall of the housing 20 has a first protrusion 21 corresponding to the hole 19. When magnetic poles of the first magnet 14, the second magnet 15, the third magnet 16, and the fourth magnet 17 are reversely or incorrectly mounted, because the hole 19 and the first protrusion 21 are disposed, the first bracket 181 on which the first magnet 14 and the second magnet 15 are disposed and the second bracket 182 on which the third magnet 16 and the fourth magnet 17 are disposed cannot be assembled in the case 10. This can effectively avoid a problem that the first magnet 14, the second magnet 15, the third magnet 16, and the fourth magnet 17 are reversely or incorrectly mounted and improve assembly accuracy and assembly efficiency.

Referring to FIG. 10, in a possible implementation, the housing 20 is buckled on the case 10, and the first clamping member 183 is adjacent to the moving contact 111. In other words, the first clamping member 183 is located on an outer side wall of an end that is of the U-shaped bracket and that is close to the moving contact 111. When the first magnet 14, the second magnet 15, the third magnet 16, and the fourth magnet 17 are disposed on the U-shaped bracket by using the first clamping member 183, a side that is of the magnet and that is close to the fixed contact 112 is not limited. Consequently, there is a slip risk. In this embodiment, an inner wall of an end that is of the housing 20 and that is adjacent to the fixed contact 112 has a second protrusion 22. A side wall of the at least one of the first magnet 14, the second magnet 15, the third magnet 16, and the fourth magnet 17 abuts against a side wall of the second protrusion 22. In this way, a position of the magnet is further limited by using the second protrusion 22. The first clamping member 183, the second clamping member 184, and the second protrusion 22 jointly limit the magnet, to prevent the magnet from falling off the U-shaped bracket and improve disposition stability of the magnet.

In this embodiment, referring to FIG. 2, the direct current contactor 100 further includes a base plate 30. The case 10 covers the base plate 30. The case 10 and the base plate 30 surround the arc-extinguishing cavity 12. The base plate 30 and the case 10 may surround a sealed arc-extinguishing cavity 12. The base plate 30 may also be a magnetic conductive plate with magnetic conductive performance such as a ceramic, so that the external magnetic field can be shielded.

The case 10 and the base plate 30 may be connected through welding, bonding, clamping, fastening, and the like. The case 10 and the base plate 30 may be directly connected, or the case 10 and the base plate 30 may be indirectly connected. For example, in a possible implementation, referring to FIG. 2, the case 10 and the base plate 30 are connected by using a connecting piece 40. The case 10 and the base plate 30 may be connected through welding by using a metal connecting piece 40. Compared with a manner in which the case 10 and the base plate 30 are directly connected, in a manner of implementing a connection by using the connecting piece 40, a problem that the case 10 and the base plate 30 are deformed, are separated, and fall off in a high temperature may be reduced, to improve reliability of the direct current contactor 100.

In this embodiment, referring to FIG. 5, a side wall that is of the first baffle 13 and that faces the first arc-extinguishing chamber 121 has a third protrusion 131, and one side wall of the first baffle 13 is used as a side wall of the first arc-extinguishing chamber 121. Under an action of the first magnetic field, the arc between the first moving contact 111a and the first fixed contact 112a or between the second moving contact 111b and the second fixed contact 112b is blown to the side wall. Because the third protrusion 131 is disposed on the side wall, a length of the side wall is increased, and a creepage distance between the first moving contact 111a and the first fixed contact 112a, and the second moving contact 111b and the second fixed contact 112b is increased. This helps extinguish the arc in a timely manner, saves space required for arc extinguishing, further improves break performance of the direct current contactor 100, and helps reduce a volume of the direct current contactor 100.

Referring to FIG. 5, a side wall that is of the first baffle 13 and that faces the second arc-extinguishing chamber 122 has a fourth protrusion 132, and the other side wall of the first baffle 13 is used as a side wall of the second arc-extinguishing chamber 122. Under an action of the second magnetic field, the arc between the third moving contact 111c and the third fixed contact 112c or between the fourth moving contact 111d and the fourth fixed contact 112d is blown to the side wall. Because the fourth protrusion 132 is disposed on the side wall, similarly, a length of the side wall is increased, and a creepage distance between the third moving contact 111c and the third fixed contact 112c, and the fourth moving contact 111d and the fourth fixed contact 112d is increased. This helps extinguish the arc in a timely manner, saves space required for arc extinguishing, and further improves break performance of the direct current contactor 100.

There may be one third protrusion 131 and one fourth protrusion 132, or there may be a plurality of third protrusions 131 and a plurality of fourth protrusions 132. As shown in FIG. 5, there may be two third protrusions 131 and two fourth protrusions 132. The two third protrusions 131 divide the first arc-extinguishing chamber 121 into three layers shown in FIG. 5. The first moving contact 111a and the first fixed contact 112a, and the second moving contact 111b and the second fixed contact 112b are respectively located at two layers at ends. The two fourth protrusions 132 divide the second arc-extinguishing chamber 122 into three layers. The third moving contact 111c and the third fixed contact 112c, and the fourth moving contact 111d and the fourth fixed contact 112d are respectively located at two layers at ends.

Referring to FIG. 5, a side wall that is of the first arc-extinguishing chamber 121 and that is opposite to the first baffle 13 may have a fifth protrusion 1211. Under an action of the first magnetic field, the arc between the first moving contact 111a and the first fixed contact 112a or between the second moving contact 111b and the second fixed contact 112b in the first arc-extinguishing chamber 121 may be blown to the side wall. Because the fifth protrusion 1211 is disposed on the side wall, a length of the side wall may be increased, and the creepage distance between the first moving contact 111a and the first fixed contact 112a, and the second moving contact 111b and the second fixed contact 112b may be increased. This helps extinguish the arc in a timely manner, saves space required for arc extinguishing, and further improves break performance of the direct current contactor 100.

A side wall that is of the second arc-extinguishing chamber 122 and that is opposite to the first baffle 13 may have a sixth protrusion 1221. Under an action of the second magnetic field, the arc between the third moving contact 111c and the third fixed contact 112c or between the fourth moving contact 111d and the fourth fixed contact 112d is blown to the side wall. Because the sixth protrusion 1221 exists on the side wall, similarly, a length of the side wall is increased, and the creepage distance between the third moving contact 111c and the third fixed contact 112c, and the fourth moving contact 111d and the fourth fixed contact 112d is increased. This helps extinguish the arc in a timely manner, saves space required for arc extinguishing, and further improves break performance of the direct current contactor 100.

Figure 4:
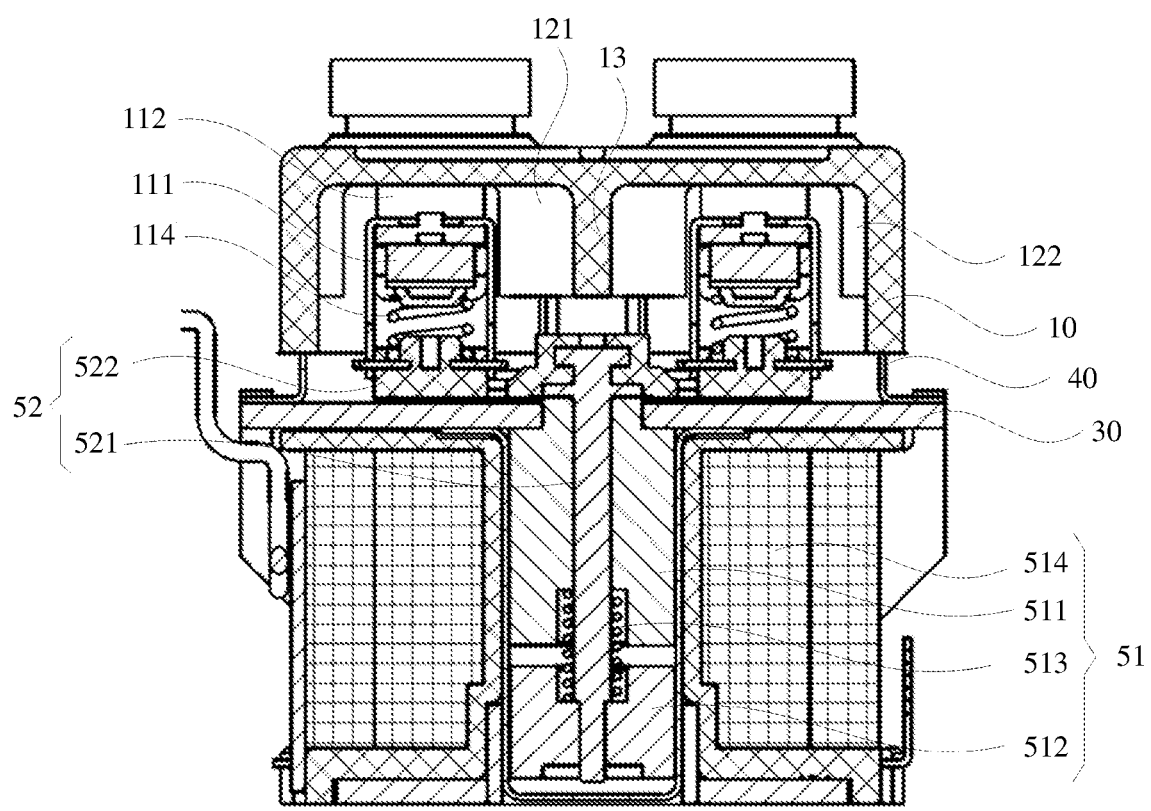
FIG. 4 is a schematic diagram of a cross section of a direct current contactor according to an embodiment.

In this embodiment, the drive system 50 includes a drive component 51 and a moving component 52. Referring to FIG. 4, the moving component 52 includes a support rod 521 and a moving plate 522 connected to the support rod 521. The moving plate 522 is located in the arc-extinguishing cavity 12, and the moving contacts 111 of the two groups of contact components 11 are disposed on the moving plate 522. In other words, the first moving contact 111a, the second moving contact 111b, the third moving contact 111c, and the fourth moving contact 111d are disposed on the moving plate 522. The driving component 51 is configured to drive the moving component 52 to move to drive the moving contacts 111 to move. The driving component 51 may drive the support rod 521 in the moving component 52 to move up and down, and the support rod 521 drives the moving plate 522 to move, to drive the moving contacts 111 on the moving plate 522 to move in the direction close to or away from the fixed contacts 112, so that the moving contacts 111 are connected to or disconnected from the fixed contacts 112.

Figure 12:
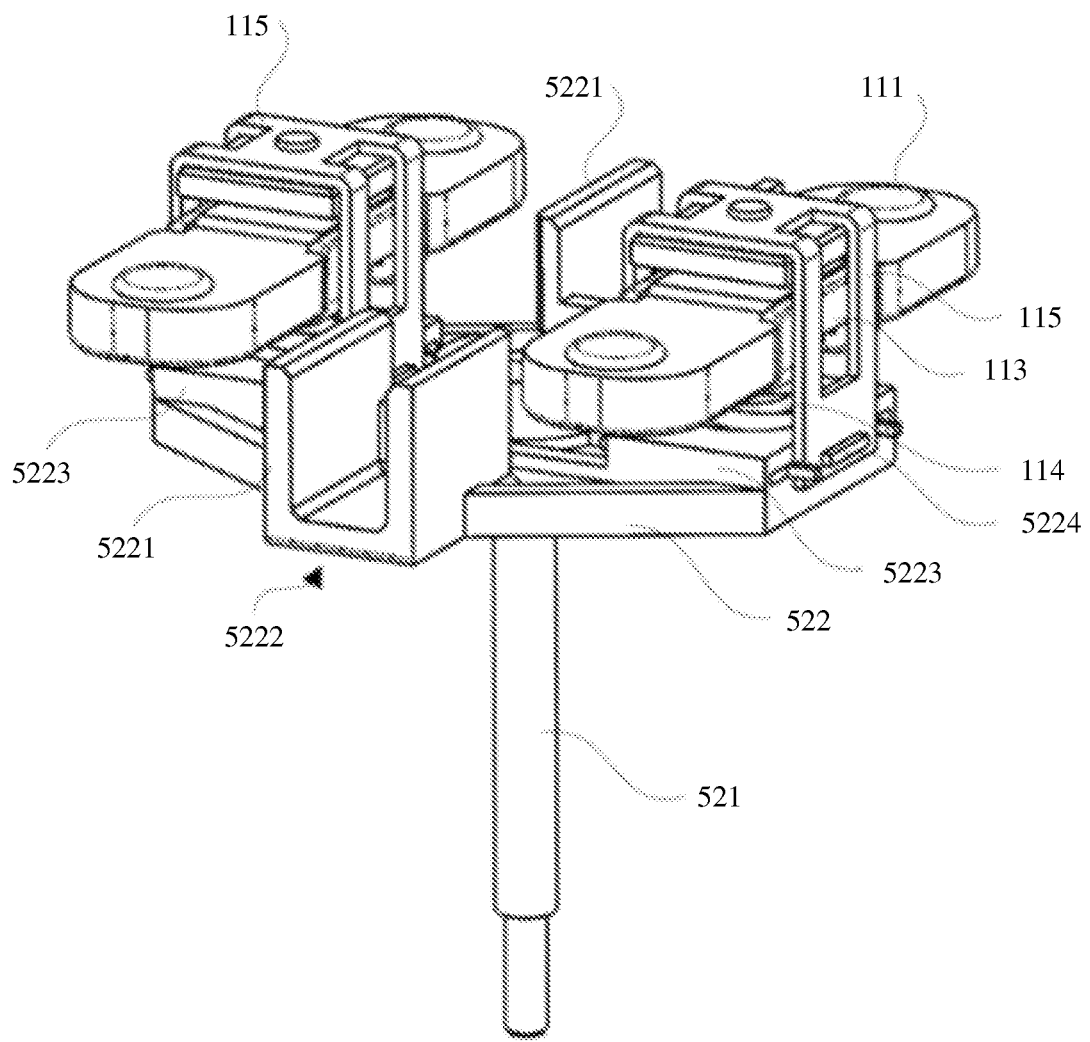
FIG. 12 is a schematic diagram of disposing a moving component and a contact component in a direct current contactor according to an embodiment.

Referring to FIG. 12, the moving plate 522 is a plate-like structure with an area. Compared with an existing manner in which the moving contacts are disposed on a connecting rod, in this manner, the moving plate 522 may provide higher strength and have higher mechanical strength. This helps improve reliability of the direct current contactor 100.

The moving plate 522 and the support rod 521 may be integrally formed, or the support rod 521 and the moving plate 522 may be separately disposed. The support rod 521 and the moving plate 522 may be fastened and connected through thread-connection, welding, bonding, and the like.

In this embodiment, when the moving contacts 111 are disconnected from the fixed contacts 112, there is a gap between the first baffle 13 and the moving plate 522. The gap provides space for the moving plate 522 to move, so as to ensure that the moving plate 522 can move to drive the moving contacts 111 to move.

Figure 6:
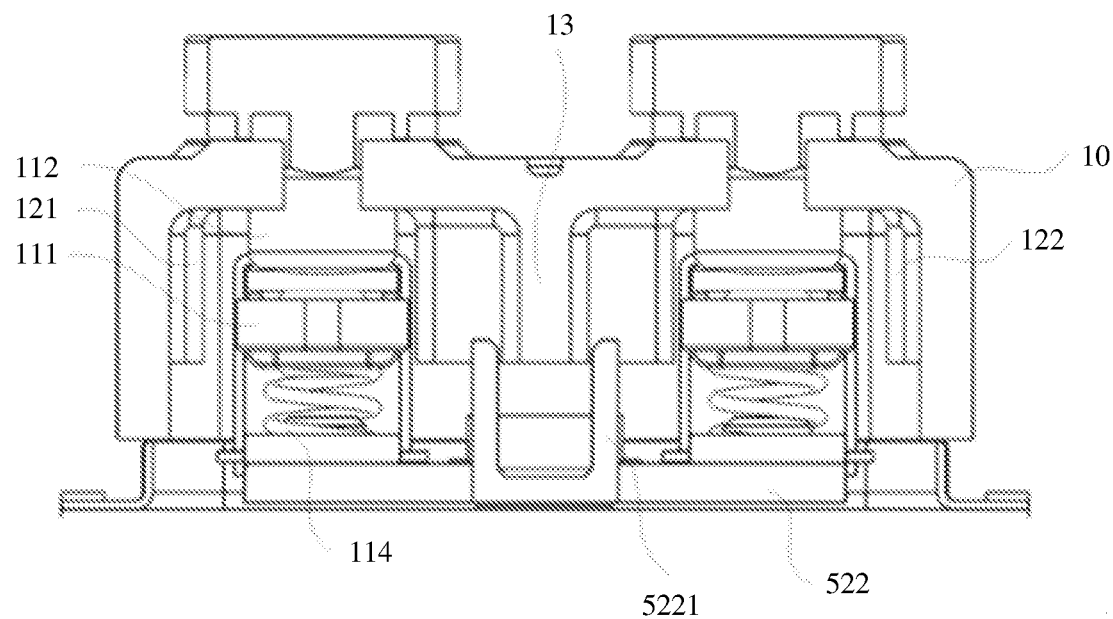
FIG. 6 is a schematic diagram of a cross section of an arc-extinguishing cavity in a direct current contactor according to an embodiment.

Because there is a gap between the first baffle 13 and the moving plate 522, an arc generated in one of the first arc-extinguishing chamber 121 and the second arc-extinguishing chamber 122 may appear in the other chamber through the gap, and a problem such as arc aggregation and a short circuit occurs. Therefore, in this embodiment, referring to FIG. 6, the moving plate 522 has a second baffle 5221, and the second baffle 5221 is located on an outer side of the gap, to ensure that the second baffle 5221 does not affect movement of the moving plate 522. The second baffle 5221 extends towards the first baffle 13, and the second baffle 5221 at least partially overlaps the first baffle 13. An end of the second baffle 5221 that faces the first baffle 13 partially overlaps an end that is of the first baffle 13 and that faces the second baffle 5221, so that the second baffle 5221 can cover the gap. In this way, sealing between the first arc-extinguishing chamber 121 and the second arc-extinguishing chamber 122 is further improved, a probability that the arcs in the first arc-extinguishing chamber 121 and the second arc-extinguishing chamber 122 are in contact with each other is further reduced, and break performance of the direct current contactor 100 is improved.

A plane on which the first baffle 13 is located is used as a first plane. That the second baffle 5221 at least partially overlaps the first baffle 13 means that a projection of the second baffle 5221 on the first plane at least partially overlaps the first baffle 13.

The second baffle 5221 may be a baffle plate, or the second baffle 5221 may be a mechanical part with a baffle plate. The moving plate 522 may have one second baffle 5221 or may have a plurality of second baffles 5221.

Referring to FIG. 12, a groove 5222 is disposed on the moving plate 522, a side wall of the groove 5222 forms the second baffle 5221, and the first baffle 13 may extend into the groove 5222. When the moving plate 522 moves upwards to enable the moving contacts 111 to be connected to the fixed contacts 112, the first baffle 13 may extend into the groove 5222. The groove 5222 has two side walls and one bottom wall connected to the two side walls. The two side walls of the groove 5222 are used as two second baffles 5221, and the two second baffles 5221 and the first baffle 13 jointly isolate and separate the first arc-extinguishing chamber 121 and the second arc-extinguishing chamber 122. In addition, the groove 5222 may be further disposed to increase a creepage distance between the first moving contact 111a and the first fixed contact 112a, and the third moving contact 111c and the third fixed contact 112c, and a creepage distance between the second moving contact 111b and the second fixed contact 112b, and the fourth moving contact 111d and the fourth fixed contact 112d. This helps extinguish the arc in a timely manner and improve break performance of the direct current contactor 100.

The groove 5222 and the moving plate 522 may be integrally formed, or the groove 5222 may be separately formed and then disposed on the moving plate 522. The groove 5222 and the moving plate 522 may be disposed through clamping, bonding, welding, thread-fastening, and the like.

In this embodiment, an arc is generated at a position at which the moving contact 111 is opposite to the fixed contact 112, and an arc at a position at which two moving contacts 111 are connected has a relatively small impact. Therefore, referring to FIG. 5, the second baffle 5221 may be disposed only at each of positions that are on the moving plate 522 and that are opposite to the two moving contacts 111, and no second baffle 5221 may be disposed at a position opposite to a position at which the moving contacts 111 are connected. In this way, a structure of the moving component 52 can be simplified, and costs can also be reduced.

Referring to FIG. 2, the drive system 50 further includes a drive chamber 53, and the drive component 51 is located in the drive chamber 53. Referring to FIG. 4, one end of the support rod 521 is located in the drive chamber 53, and the other end of the support rod 521 extends into the arc-extinguishing cavity 12. The drive chamber 53 may be connected to the case 10. The drive chamber 53 and the case 10 may share the base plate 30, in other words, the base plate 30 is used as a side wall of the drive chamber 53. The base plate 30 may have a through hole, and the other end of the support rod 521 may extend into the arc-extinguishing cavity 12 through the through hole.

In this embodiment, referring to FIG. 4, the drive component 51 may include a fixed iron core 511 and a moving iron core 512 that are sleeved on the support rod 521. The fixed iron core 511 is located at an end that is of the support rod 521 and that is close to the base plate 30. The moving iron core 512 is located at an end that is of the support rod 521 and that is away from the base plate 30. In addition, the moving iron core 512 is fastened and connected to the support rod 521, and the fixed iron core 511 is fastened and connected to a case of the drive chamber 53. There is a gap between the fixed iron core 511 and the moving iron core 512. A reset spring 513 is disposed in the gap. The reset spring 513 is sleeved on a periphery of the support rod 521, and one end of the reset spring 513 abuts against the moving iron core 512, and the other end of the reset spring 513 abuts against the fixed iron core 511. The drive component 51 may further include an electromagnetic coil 514 that surrounds the fixed iron core 511 and the moving iron core 512. When the electromagnetic coil 514 is powered on, the fixed iron core 511 and the moving iron core 512 attract each other.

When the direct current contactor 100 is used, the electromagnetic coil 514 is powered on, the fixed iron core 511 and the moving iron core 512 attract each other, and the fixed iron core 511 is fastened in the drive chamber 53. In this case, the moving iron core 512 moves towards the fixed iron core 511 against elastic force of the reset spring 513 and drives the support rod 521 to move. The support rod 521 drives the moving plate 522 to move, to drive the moving contacts 111 on the moving plate 522 to move in the direction close to the fixed contacts 112, so as to enable the moving contacts 111 to be in electrical contact with the fixed contacts 112, so that the moving contacts 111 are connected to the fixed contacts 112. When the electromagnetic coil 514 is powered off, there is no magnetic attraction force between the fixed iron core 511 and the moving iron core 512. Under an action of the reset spring 513, the moving iron core 512 moves away from the fixed iron core 511, to drive the support rod 521 and the moving plate 522 to move, and drive the moving contacts 111 to move in the direction away from the fixed contacts 112, so as to enable the moving contacts 111 to be separated from the fixed contacts 112, so that the moving contacts 111 are disconnected from the fixed contacts 112.

Referring to FIG. 7, the contact component 11 further includes a moving contact bridge 113. The two moving contacts 111 are connected to each other by using the moving contact bridge 113. The two moving contacts 111 are located on two sides of the moving contact bridge 113. Referring to FIG. 12, the contact component 11 further includes an elastic component 114. The elastic component 114 is located between the moving contact bridge 113 and the moving plate 522. The elastic component 114 may be a spring. When the moving plate 522 moves to drive the moving contacts 111 to move in the direction close to the fixed contacts 112, the moving contacts 111 first abut against the fixed contacts 112. When the moving plate 522 continues to move, the elastic component 114 located between the moving plate 522 and the moving contact bridge 113 is compressed, and the compressed elastic component 114 pushes the moving contacts 111, so that the moving contacts 111 are pressed against the fixed contacts 112. This ensures reliable contact between the moving contacts 111 and the fixed contacts 112 and improves stability of a connection between the moving contacts 111 and the fixed contacts 112.

In an existing contactor, the moving contact 111 and the elastic component 114 are connected through sleeving by using a shaft hole. There is a connecting rod between the moving contact 111 and the moving component 52, one end of the connecting rod passes through the moving contact 111 and is fastened to the moving contact 111, and the other end of the connecting rod is fastened and connected to the moving component 52. The elastic component 114 is sleeved on the connecting rod. In the manner in which the moving contact 111 and the elastic component 114 are connected through sleeving by using a shaft hole, a hole may need to be provided on the moving contact 111. Consequently, a conductive area of the moving contact 111 is reduced, and a conductive capability is reduced.

Referring to FIG. 12, the contact component 11 may further include a U-shaped fixed bracket 115, the moving contact bridge 113 and the elastic component 114 are located in the fixed bracket 115, the elastic component 114 is located between the moving contact bridge 113 and the moving plate 522, and an opening end of the fixed bracket 115 is disposed on the moving plate 522. In this way, the moving contact bridge 113 and the elastic component 114 are disposed on the moving plate 522 by using the fixed bracket 115, and no shaft hole needs to be provided on the moving contact 111 and the moving contact bridge 113. This avoids affecting a conductive area of the contact component 11, ensures conductive performance of the contact component 11, and helps improve a capability of the contact component 11 to carry a current.

To further stabilize the elastic component 114, a seventh protrusion (not shown) may be provided at each of positions that are on the moving plate 522 and the moving contact bridge 113 and that correspond to the elastic component 114. Two ends of the elastic component 114 are respectively sleeved on peripheries of the seventh protrusions. The seventh protrusion may play a role of limiting and guiding the elastic component 114, so that the elastic component 114 is prevented from falling off between the moving contact bridge 113 and the moving plate 522, and the elastic component 114 can also be prevented from being distorted and then being in capable of being compressed.

The fixed bracket 115 may be disposed on the moving plate 522 through bonding, welding, clamping, thread-connection, and the like. In this embodiment, referring to FIG. 12, the moving plate 522 may have a boss 5223 protruding from a plane on which the moving plate 522 is located. The boss 5223 is configured to dispose the contact component 11, and two opposite side walls of the boss 5223 each may have a protruding third clamping member 5224. The opening end of the fixed bracket 115 may have a clamping slot (not shown) that can match the third clamping member 5224, and the opening end of the fixed bracket 115 may be clamped and fastened to the moving plate 522 through matching between the clamping slot and the third clamping member 5224, to fasten the moving contact 111 and the elastic component 114 to the moving plate 522 by using the fixed bracket 115.

An embodiment may further provide a vehicle, including at least any one of the foregoing direct current contactors 100. The vehicle may be an electric vehicle (EV), a pure electric vehicle (PEV/BEV), a hybrid electric vehicle (HEV), a range extended electric vehicle (REEV), a plug-in hybrid electric vehicle (PHEV), a new energy vehicle, or the like.

The vehicle may further include a vehicle body and a power distribution unit disposed on the vehicle body, and the power distribution unit is connected to the direct current contactor 100. The vehicle may further include a wheel, a motor, a drive component, and the like.

The vehicle provided in this embodiment may include the direct current contactor 100, and in the direct current contactor 100, a single drive manner may be used to integrate two groups of contact components into one arc-extinguishing cavity, to implement a dual connection between the contactor and both a positive line and a negative line, so that a structure of the contactor is simplified. In addition, there is no need to dispose one contactor on each of the positive line and the negative line, so that a volume and manufacture costs of a charging apparatus are significantly reduced, and miniaturization is implemented, and a load capability is improved, to help implement a low-cost and lightweight requirement of the vehicle.

In the description of the embodiments, it should be noted that, the terms "assemble", "connected", and "connection" should be understood in a broad sense. For example, the terms may be used for a fixed connection, an indirect connection through an intermediate medium, an internal connection between two elements, or an interaction relationship between two elements. Persons of ordinary skill in the art may understand meanings of the terms in the embodiments.

The terms "first", "second", "third", "fourth" and the like (if they exist) may be used to distinguish similar objects, and do not need to be used to describe an order or sequence.

Finally, it should be noted that the foregoing embodiments are merely intended for describing the embodiments rather than limiting them. Although the embodiments are described in detail, persons of ordinary skill in the art should understand that they may still make modifications without departing from the scope of the embodiments.

What is claimed is:

1. A direct current contactor, comprising
a case having an arc-extinguishing cavity, wherein a first baffle is disposed in the arc- extinguishing cavity that divides the arc-extinguishing cavity into a first arc-extinguishing chamber and a second arc-extinguishing chamber;
two groups of contact components disposed in the case, wherein each group of contact components comprises two moving contacts connected to each other and two fixed contacts opposite to the moving contacts, the fixed contacts extend outside the case, and the two groups of contact components are respectively disposed in the first arc-extinguishing chamber and the second arc-extinguishing chamber;
a drive system, wherein the drive system is connected to the moving contacts of the two groups of contact components, and configured to drive the moving contacts to move in a direction close to or away from the fixed contacts, so that the moving contacts are disconnected from or connected to the fixed contacts,
a first magnet and a second magnet are respectively disposed on two sides that are outside the first arc-extinguishing chamber and that are adjacent to the two moving contacts, the first magnet and the second magnet attract each other to form a first magnetic field, and the first magnet and the second magnet are opposite to gaps between the moving contacts and the fixed contacts; a third magnet and a fourth magnet are respectively disposed on two sides that are outside the second arc-extinguishing chamber and that are adjacent to the two moving contacts, the third magnet and the fourth magnet attract each other to form a second magnetic field, and the third magnet and the fourth magnet are opposite to gaps between the moving contacts and the fixed contacts; and
magnetic field directions of the first magnetic field and the second magnetic field are perpendicular to directions of currents flowing through the fixed contacts and the moving contacts, and the magnetic field direction of the first magnetic field is opposite to the magnetic field direction of the second magnetic field; and
a mounting bracket, wherein the mounting bracket comprises a first bracket and a second bracket that are opposite to each other, the first bracket and the second bracket are disposed around a periphery of the case, the first magnet and the second magnet are disposed on an inner side wall of the first bracket, and the third magnet and the fourth magnet are disposed on an inner side wall of the second bracket, wherein the first bracket and the second bracket are U-shaped brackets, a side wall of the U-shaped bracket has a first clamping member, an end of an opening of the U-shaped bracket has a second clamping member protruding towards the inside of the opening, and at least one of the first magnet, the second magnet, the third magnet, or the fourth magnet is disposed on the U-shaped bracket by using the first clamping member and the second clamping member.

2. The direct current contactor according to claim 1, further comprising:
a housing, wherein the mounting bracket is located in the housing, a side, or a corner of the at least one of the first magnet, the second magnet, the third magnet, and the fourth magnet has a hole, and an inner side wall of the housing has a first protrusion corresponding to the hole.

3. The direct current contactor according to claim 2, wherein the first clamping member is adjacent to the moving contact, an inner wall of an end of the housing that is adjacent to the fixed contact has a second protrusion, and a side wall of the at least one of the first magnet, the second magnet, the third magnet, and the fourth magnet abuts against a side wall of the second protrusion.

4. The direct current contactor according to claim 1, wherein the first bracket and the second bracket are magnetic conductive plates with magnetic conductive performance.

5. The direct current contactor according to claim 1, wherein the first magnet, the second magnet, the third magnet, and the fourth magnet are permanent magnets.

6. The direct current contactor according to claim 1, further comprising:
a base plate, wherein the case is disposed on the base plate, and the case and the base plate surround the arc-extinguishing cavity.

7. The direct current contactor according to claim 6, wherein the case and the base plate are connected by using a connecting piece.

8. The direct current contactor according to claim 1, wherein a side wall of the first baffle that faces the first arc-extinguishing chamber has a third protrusion, and a side wall of the first baffle that faces the second arc-extinguishing chamber has a fourth protrusion.

9. The direct current contactor according to claim 1, wherein a side wall of the first arc-extinguishing chamber that is opposite to the first baffle has a fifth protrusion, and a side wall of the second arc-extinguishing chamber that is opposite to the first baffle has a sixth protrusion.

10. The direct current contactor according to claim 1, wherein the drive system further comprises:
a drive component and a moving component, the moving component comprises a support rod and a moving plate connected to the support rod, the moving plate is located in the arc-extinguishing cavity, and the moving contacts of the two groups of contact components are disposed on the moving plate; and the drive component is configured to drive the moving component to move to drive the moving contacts to move, and when the moving contacts are disconnected from the fixed contacts, there is a gap between the first baffle and the moving plate.

11. The direct current contactor according to claim 10, wherein the moving plate has a second baffle, the second baffle is located on an outer side of the gap, the second baffle extends towards the first baffle, and the second baffle at least partially overlaps the first baffle.

12. The direct current contactor according to claim 11, wherein a groove is disposed on the moving plate, a side wall of the groove forms the second baffle, and the first baffle extends into the groove.

13. The direct current contactor according to claim 12, wherein the second baffle is disposed on the moving plate and opposite to the two moving contacts.

14. The direct current contactor according to claim 10, wherein the drive system further comprises:
a drive chamber, the drive component is located in the drive chamber, one end of the support rod is located in the drive chamber, and the other end of the support rod extends into the arc-extinguishing cavity.

15. The direct current contactor according to claim 10, wherein the contact component further comprises:
a moving contact bridge and an elastic component, the two moving contacts are connected by using the moving contact bridge, and the elastic component is located between the moving contact bridge and the moving plate.

16. The direct current contactor according to claim 15, wherein the contact component further comprises:
a U-shaped fixed bracket, the moving contact bridge and the elastic component are located in the fixed bracket, and an opening end of the fixed bracket is disposed on the moving plate.

17. A vehicle, comprising a direct current contactor, wherein the direct current contactor comprises:
a case having an arc-extinguishing cavity and a first baffle is disposed in the arc- extinguishing cavity that divides the arc-extinguishing cavity into a first arc-extinguishing chamber and a second arc-extinguishing chamber;
two groups of contact components disposed in the case, wherein each group of contact components comprises two moving contacts connected to each other and two fixed contacts opposite to the moving contacts, the fixed contacts extend outside the case; and the two groups of contact components are respectively disposed in the first arc-extinguishing chamber and the second arc-extinguishing chamber;
a drive system, wherein the drive system is connected to the moving contacts of the two groups of contact components and configured to drive the moving contacts to move in a direction close to or away from the fixed contacts, so that the moving contacts are disconnected from or connected to the fixed contacts,
a first magnet and a second magnet are respectively disposed on two sides that are outside the first arc-extinguishing chamber and that are adjacent to the two moving contacts, the first magnet and the second magnet attract each other to form a first magnetic field, and the first magnet and the second magnet are opposite to gaps between the moving contacts and the fixed contacts; a third magnet and a fourth magnet are respectively disposed on two sides that are outside the second arc-extinguishing chamber and that are adjacent to the two moving contacts, the third magnet and the fourth magnet attract each other to form a second magnetic field, and the third magnet and the fourth magnet are opposite to gaps between the moving contacts and the fixed contacts; and
magnetic field directions of the first magnetic field and the second magnetic field are perpendicular to directions of currents flowing through the fixed contacts and the moving contacts, and the magnetic field direction of the first magnetic field is opposite to the magnetic field direction of the second magnetic field; and
a mounting bracket, wherein the mounting bracket comprises a first bracket and a second bracket that are opposite to each other, the first bracket and the second bracket are disposed around a periphery of the case, the first magnet and the second magnet are disposed on an inner side wall of the first bracket, and the third magnet and the fourth magnet are disposed on an inner side wall of the second bracket, wherein the first bracket and the second bracket are U-shaped brackets, a side wall of the U-shaped bracket has a first clamping member, an end of an opening of the U-shaped bracket has a second clamping member protruding towards the inside of the opening, and at least one of the first magnet, the second magnet, the third magnet, or the fourth magnet is disposed on the U-shaped bracket by using the first clamping member and the second clamping member.

* * * * *